United States Patent [19]

Lucas

[11] Patent Number: 5,232,982
[45] Date of Patent: Aug. 3, 1993

[54] ONE COMPONENT ROOM TEMPERATURE VULCANIZING SILICONE ELASTOMER WITH IMPROVED PRIMERLESS ADHESION TO POLYCARBONATE

[75] Inventor: Gary M. Lucas, Scotia, N.Y.

[73] Assignee: General Electric Company, Waterford, N.Y.

[21] Appl. No.: 864,745

[22] Filed: Apr. 7, 1992

[51] Int. Cl.$^5$ .............................................. C08K 5/24
[52] U.S. Cl. ........................................ 524/731; 524/730; 528/18; 528/901
[58] Field of Search ............... 528/18, 901; 524/730, 524/731

[56] References Cited

U.S. PATENT DOCUMENTS

| | | | |
|---|---|---|---|
| 4,100,129 | 7/1978 | Beers | 260/37 |
| 4,273,698 | 6/1981 | Mitchell | 260/37 |
| 4,417,042 | 11/1983 | Dziark | 528/18 |
| 4,483,973 | 11/1984 | Lucas et al. | 528/21 |
| 4,506,058 | 3/1985 | Lucas | 524/730 |
| 4,514,529 | 4/1985 | Beers | 523/200 |
| 4,515,932 | 5/1985 | Chung | 528/16 |
| 4,517,337 | 5/1985 | Lockhart et al. | 524/859 |
| 4,528,353 | 7/1985 | Lucas et al. | 528/21 |
| 4,585,821 | 4/1986 | Progneaux et al. | 524/425 |
| 4,623,693 | 11/1986 | Inoue et al. | 524/700 |
| 4,672,003 | 6/1987 | Letoffe | 428/447 |
| 4,680,364 | 7/1987 | Lucas | 528/15 |
| 4,849,388 | 7/1989 | Millet | 502/102 |
| 4,891,393 | 1/1990 | Hirai et al. | 523/212 |
| 4,962,152 | 10/1990 | Leempol | 524/788 |

*Primary Examiner*—Melvyn I. Marquis

[57] ABSTRACT

A one component RTV composition having improved primerless adhesion to polycarbonate is formed of: A) polyalkoxysilane endcapped dimethylsilicone polymer, (B) reinforcing fumed silica fillers, (D) organosiloxane plasticizing oils, (E) an optional alkoxy silane cross-linker, (F) a stabilizing amount of a disilazane or polysilazane, (G) a tin condensation cure catalyst from the class of $R_2Sn(beta-diketonate)_2$ complexes, and (H)/(C) a glycidoxypropyltrimethoxy silane/cyanoethyltrimethoxysilane co-adhesion promoting system, having improved auto-adhesion to polycarbonate.

50 Claims, 7 Drawing Sheets

ONE COMPONENT ROOM TEMPERATURE VULCANIZING SILICONE ELASTOMER WITH IMPROVED PRIMERLESS ADHESION TO POLYCARBONATE

FIELD OF THE INVENTION

The invention relates to room temperature vulcanizable (RTV) silicone compositions, and in particular to translucent alkoxy curing RTV silicone elastomers having improved primerless adhesion to polycarbonate.

BACKGROUND OF THE INVENTION

Translucent, room temperature curable silicone sealants frequently demonstrate adequate auto-adhesion to glass, aluminum and PVC. Adhesion to other plastics, for example polycarbonate, is often less than desired and frequently degenerates upon prolonged exposure to water. For example, translucent, alkoxycuring RTV compositions disclosed by Lucas et al. (U.S. Pat. Nos. 4,483,973 and 4,528,353) show excellent long-term primerless adhesion to glass, aluminum, and PVC, and demonstrate excellent short-term (i.e. <3 month at room temperature) adhesion to polycarbonate. However, the RTV compositions utilize di-amino functional silane adhesion promoters which chemically attack the polycarbonate surface causing crazing and adhesion loss within 1–3 months.

The use of titanium chelates as self bonding agents for alkoxy curing RTV's is disclosed by Lucas (U.S. Pat. No. 4,680,364). The compositions are fumed silica filled and are self bonding to polycarbonate but have the limitation of opacity due to the poor solubility of the titanium chelates in PDMS.

There are numerous other examples in the art describing self bonding, 1-part RTV compositions for example; Ashby and Lucas (U.S. Pat. No. 4,506,058), Beers (U.S. Pat. No. 4,100,129 and 4,514,529) Mitchell (U.S. Pat. No. 4,273,698), composition having improved primerless adhesion to polycarbonate, comprising:

(A) 100 parts of a polyalkoxy terminated PDMS having the formula 1:

where each R and $R^2$ is independently a substituted or unsubstituted monovalent hydrocarbon radical having from 1 to about 15 carbon atoms $C_{(1-15)}$, $R^1$ is a $C_{(1-8)}$ aliphatic organic radical selected from alkyl radicals, alkyl ether radicals, alkylketone radicals, alkylcyano radicals having from 1 to about 8 carbon atoms $C_{(1-8)}$, or an aralkyl radical having from about 7 to about 13 carbon atoms $C_{(7-13)}$; "n" is a whole number ranging from about 5 to about 2500, and "a" is a whole number which is either 0 or 1. The viscosity range of the polymer of formula (1) is 50 to about 65,000 cps at 25° C.

(B) from about 5 to about 20 parts by weight based upon (A) of a silica filler, preferably fumed silica having a surface area up to about 300 m²/gm. in the untreated state.

(C) from about 0.3 to about 1 part by weight based upon (A) of a cyano-functional polyalkoxy silane having the formula: Leempol (U.S. Pat. No. 4,962,152), Inoue et al. (U.S. Pat. No. 4,623,693), Letoffe (U.S. Pat. No. 4,672,003), Hirai et al. (U.S. Pat. No. 4,891,393) and Progneaux and Trego (U.S. Pat. No. 4,585,821). None of these, however, shows auto adhesion to polycarbonate.

It is desirable to provide a curable RTV silicone composition containing a reinforcing inorganic filler, having a combination of properties including translucency, alkoxy cure, fast cure, and shelf stability coupled with excellent long term primerless adhesion to polycarbonate under dry and wet conditions.

SUMMARY OF THE INVENTION

The present invention is directed to one component, translucent, alkoxy curing, room temperature vulcanizable (RTV) compounds comprising:

(A) a polyalkoxysilane endcapped dimethylsilicone polymer, (B) a reinforcing silica filler, (D) organosiloxane plasticizing oils, (E) an optional alkoxy silane crosslinker, (F) a stabilizing amount of a disilazane or polysilazane, and (G) a tin condensation cure catalyst from the class of $R_2Sn(beta-diketonate)_2$ complexes, and (H)/(C) a glycidoxypropyltrimethoxy silane/cyanoethyltrimethoxysilane co-adhesion promoting system, having improved auto-adhesion to poly-carbonate.

In a particular embodiment the invention is a shelf stable, translucent, one component room temperature vulcanizable (RTV) organo-polysiloxane where each $R_3$ and $R^4$ is independently a monovalent hydrocarbon or substituted hydrocarbon radical having from 1 to about 18 carbon atoms $(C_{1-18})$, $R^5$ is a divalent hydrocarbon radical having from about 2 to about 12 carbon atoms $(C_{2-12})$, and "t" is a number ranging from 0 to about 3;

(D) from about 15 to 30 parts by weight based upon (A) of a blend of:

(1) 50 to 100 parts by weight of a triorganosilyl endstopped diorganopolysiloxane having a viscosity ranging from 10 to 5000 cps at 25 deg.C., where the organo groups are monovalent hydrocarbon radicals, having from 1 to about 8 carbon atoms $(C_{1-8})$, and (2) 0 to 50 parts by weight of a polysiloxane fluid having a viscosity ranging from about 5 to about 100 cps at 25° C.

(E) up to about 5 parts by weight based upon (A) of a polyalkoxysilane crosslinking agent having the formula (3):

where $R^1, R^2$ and "a" are as previously defined.

(F) from about 0.3 to 1.7 parts by weight based upon (A) of a stabilizing disilazane or polysilazane.

(G) from about 0.14 to about 0.34 parts by weight based upon (A) of a diorganotin-bis-diketonate condensation cure catalyst of the general formula:

where $R^6$ is selected from monovalent hydrocarbon radicals and substituted hydrocarbon radicals having from 1 to about 18 carbon atoms $C_{(1-18)}$, and $R^7$, $R^8$, and $R^9$ are the same or different monovalent radicals selected from the class consisting of hydrogen, $R^6$, $OR^6$, $—Si(R^6)_3$, aryl, acyl, and nitrile.

(H) from about 0.1 to about 2 parts by weight based upon (A) of an epoxy silane adhesion promoter having the formula:

where $R^{10}$ and $R^{11}$ are monovalent hydrocarbon radicals having from 1 to about 8 carbon atoms ($C_{1-8}$), $R^{12}$ and $R^{13}$ are divalent hydrocarbon radicals having about 2 to about 12 carbon atoms ($C_{2-12}$), $R^{14}$ is selected from the group consisting of hydrogen and monovalent hydrocarbon radicals having 1 to about 8 carbon atoms ($C_{1-8}$), and "b" varies from 0 to 3.

DETAILED DESCRIPTION OF THE INVENTION

The present invention is directed to shelf stable, translucent, one component room temperature vulcanizable (RTV) organo-polysiloxane compositions having improved primerless adhesion to polycarbonate.

In one embodiment the invention generally comprises: A) polyalkoxysilane endcapped dimethylsilicone polymer, (B) reinforcing fumed silica fillers, (D) organosiloxane plasticizing oils, (E) an optional alkoxy silane crosslinker, (F) a stabilizing amount of a disilazane or polysilazane, (G) a tin condensation cure catalyst from the class of $R_2Sn(betadiketonate)$, complexes, and (H)/(C) a glycidoxypropyltrimethoxy silane/cyanoeth-yltrimethoxysilane co-adhesion promoting system, having improved auto-adhesion to polycarbonate.

(A) is a polyalkoxy terminated PDMS (100 parts) having the formula:

where each R and $R^2$ is independently a substituted or unsubstituted monovalent hydrocarbon radical having from 1 to about 15 carbon atoms [hereafter $C_{(1-15)}$]. $R^1$ is a $C_{(1-8)}$ aliphatic organic radical selected from alkyl radicals, alkyl radicals, alkyl ether radicals, alkylketone radicals, alkylcyano radicals, or a $C_{(7-13)}$ aralkyl radical; "n" is a hole number ranging from about 5 to about 2500, and "a" is a whole number which is either 0 or 1. The viscosity range of the polymer of formula (1) is 50 to about 65,000 cps at 25° C. (A) may be produced according to the method described in Chung U.S. Pat. No. 4,515,932.

(B) is a reinforcing silica filler and is present from about 5 to about 20, preferably from about 9 to about 12 and more preferably from about 10 to about 11 parts by weight based upon (A). The silica filler, preferably fumed silica filler, has a surface area from about 100 to about 300 m²/gm and preferably from about 150 to about 250 m²/gm in the untreated state.

(C) is an adhesion promoter and is present in an amount from about 0.3 to about 1 parts, preferably from about 0.4 to about 0.8, and more preferably from about 0.6 to about 0.7 by weight based upon (A). (C) is a cyano-functional polyalkoxy silane adhesion promoter having the formula:

where each $R^3$ and $R^4$ is independently a ($C_{1-8}$) monovalent hydrocarbon or substituted hydrocarbon radical, $R^5$ is a $C_{(2-12)}$ divalent hydrocarbon radical, and "t" is a number ranging from 0 to about 3.

In the compound of formula (2), $R^3$ and $R^4$ can be alkyl radicals, e.g., methyl, ethyl, propyl, and the like; alkenyl radicals, e.g., vinyl, alyl, and the like; cycloalkyl radicals, e.g., cyclohexyl, cycloheptyl, and the like; mononuclear aryl radicals, e.g., methylphenyl and the like; and fluoroalkyl radicals, e.g., 3,3,3-trifluoropropyl. Preferably, $R^3$ and $R^4$ are selected from methyl or ethyl, and most preferably are both methyl. $R^5$ is preferably an alkylene or arylene substituted divalent hydrocarbon radical of 2 to about 12 carbon atoms ($C_{2-12}$) and more preferably from 2 to about 8 carbon atoms.

A preferred specific compound within the scope of formula (2) is beta-cyanoethyltrimethoxysilane. Other specific compounds include:
3-(cyanoethoxy)-3-methylbutenyltrimethoxysilane;
beta-cyanoethylmethyldimethoxysilane;
beta-cyanoeth-yltriethoxysilane;
beta-cyanopropyltrimethoxysilane;
2-cyanoethylmeth-yldiethoxysilane;
3-cyanopropyltriethoxysilane;
cyanopropylmethyldimethoxysilane; and
1-cyanoethyltris(methoxyethoxy)silane.

(D) is a siloxane oil in a blend present in an amount from about 15 to 30, preferably from about 18 to about 27, and more preferably from about 20 to about 25 parts by weight based upon (A). The blend comprises:

(D1) From about 10 to about 110 and more preferably from about 30 to about 70 parts by weight of a triorganosilyl endstopped diorganopoly-siloxane having a viscosity of from 10 to 5000 cps at 25 deg.C., where the organo groups are monovalent hydrocarbon radicals, preferably having from 1 to about 8 carbon atoms ($C_{1-8}$). Such linear diorganopolysiloxane polymers are useful as plasticizers. Preferably, such plasticizers are free of silanol groups but usually there is present up to 500 ppm of silanol groups. It is also preferable that the organo substituent groups are methyl and that the viscosity range varies from 10 to 1000 cps at 25° C., and (D2) from about 0 to about 50, preferably from about 10 to about 40 and more preferably from about 20 to about 30 parts by weight, of a low viscosity polysiloxane containing a high degree of trifunctionality, tetrafunctionality or a mixture of tri- and tetrafunctionality (MDT fluid). The high degree of functionality is defined as a condition such that (D2) has more than about 10 mole percent of such units. Generally, such plasticizers comprise (i) from 25 to 60 mole percent of monoalkoxysiloxy units, siloxy units, or mixtures thereof, (ii) from 1 to 6 mole percent of trialkylsiloxy units and (iii) from 34 to 74 mole percent of dialkylsiloxy units, and where the plasticizer fluid contains from 0.1 to about 2 percent by weight of silicon bonded hydroxyl units. (D2) has a viscosity ranging from about 5 to about 100 cps at 25° C.

(E) is an optimal crosslinking agent which may be present from 0 to about 5, preferably from about 0.5 to about 4 and more preferably from about 1 to about 2 parts by weight based upon (A) of a polyalkoxysilane having the formula:

(3)

where $R^1, R^2$ and "a" are as previously defined.

(F) is a stabilizing silazane present in an amount ranging from about 0.3 to 1.7, preferably from about 0.5 to about 1.5 and more preferably from about 0.75 to about 1.25 parts by weight based upon (A). (F) is a disilazane or polysilazane hydroxy scavenger including those disclosed by Dziark (U.S. Pat. No. 4,417,042). The preferred hydroxy scavenger is hexamethyldisilazane.

(G) is a catalyst present in an amount ranging from about 0.14 to about 0.34, preferably from about 0.2 to about 0.3 and more preferably from about 0.24 to about 0.28 parts by weight based upon (A). (G) is a diorganotin-bis-diketonate condensation cure catalyst of the general formula:

where $R^6$ is selected from $C_{(1-18)}$ monovalent hydrocarbon radicals and substituted hydrocarbon radicals, and $R^7$, $R^8$, and $R^9$ are the same or different monovalent radicals selected from the class consisting of hydrogen, $R^6$, $OR^6$, $-Si(R^6)_3$, aryl, acyl, and nitrile.

Radicals included within $R^6$ of formula (4) are, for example, $C_{(6-13)}$ aryl radicals and halogenated aryl radicals, such as phenyl, tolyl, chlorophenyl, naphthyl; $C_{(1-18)}$ aliphatic, cycloaliphatic radicals, and halogenated derivatives, for example, cyclohexyl, cyclobutyl; alkyl and alkenyl radicals, such as methyl, ethyl, propyl, chloropropyl, butyl, pentyl, hexyl, heptyl, octyl, vinyl, allyl, and trifluoropropyl.

Some of the tin condensation catalysts included within formula (4) are, for example:
Di(n-butyl)tinbis(acetylacetonate);
Di(n-butyl)tinbis(benzoylacetonate);
Di(ethyl)tinbis(lauroylacetonate);
Di(methyl)tinbis(pivaloylacetonate);
Di(n-ocyl)tinbis(acetylacetonate);
Di(n-propyl)tinbis(1,1,1-trifluoroacetylacetonate);
Di(n-butyl)tinbis(ethylacetoacetate); and
Di(n-butyl)tin(acetylacetonate) (ethylacetoacetate).

Diorganotin dicarboxylate condensation cure catalysts are excluded from the present invention.

(H) is an adhesion promoter present in a range from about 0.1 to about 2, preferably from about 0.5 to about 1.5 and more preferably from about 0.75 to about 1.0 parts by weight based upon (A). (H) is an epoxy silane having the formula:

(5)

where $R_{10}$ and $R_{11}$ are $C_{(1-8)}$ monovalent hydrocarbon radicals, $R^{12}$ and $R^{13}$ are $C_{(2-12)}$ divalent hydrocarbon radicals, $R^{14}$ is selected from the group consisting of hydrogen and $C_{1-8}$ monovalent hydrocarbon radicals and "b" varies from 0 to 3.

In formula (5), $R^{12}$ and $R^{13}$ can be any divalent hydrocarbon radical such as alkylene, arylene, alkylenearylene radicals, and can be substituted or unsubstituted with various groups such as halogen groups, ether groups, ester groups, and other hydrocarbon groups. $R^{14}$ can be hydrogen or a monovalent hydrocarbon radical and is preferably hydrogen. Compounds within the scope of formula (5) include, for example, g-glycidoxypropylmethyldimethosysilane, g-glycidoxypropyltriethoxysilane, g-glycidoxypropylmethyldiethoxysilane, g-glycidoxyethyltrimethoxysilane, epoxycyclohexylethyltrimethoxysilane, and epoxycyclohexylethyltrimethoxysilane. The preferred compound within the scope of formula (4) is g-glycidoxypropyltrimethoxysilane.

Suitable adhesion promoters within the scope of formula (5) and methods for making them are disclosed in U.S. Pat. No. 4,483,973 (Lucas et al.).

A detailed description of the continuous manufacture of the 1-part, translucent, alkoxy curing RTV polycarbonate adhesive, of the present invention, is given in Example I.

EXAMPLE I

Using a 30 mm Werner-Pfleiderer twin screw extruder, an RTV composition, referred to below as Composition (1), was produced as follows:

COMPOSITION (1)

(A) 60 parts by weight of an alpha, omegamethyldimethoxypolydimethylsiloxane polymer having a viscosity of 25,000 cps.

(B) 12 parts by weight based upon (A) of a D4 treated, reinforcing fumed silica filler having a surface area of 225 m²/gm in the untreated state.

(C) 0.5 parts by weight based upon (A) of cyanopropyltrimethoxysilane co-adhesion promoter (CETMS).

(D1) 18 parts by weight based upon (A) of an alpha, omega-trimethylsilylpolydimethylsiloxane oil having a viscosity of 100 cps at 25° C.

(D2) 7 parts by weight based upon (A) of an MDT silanol containing oil having a viscosity of 50 cps at 25° C.

(E) 1 part by weight based upon (A) of Methyltrimethoxysilane crosslinker.

(F) 1 part by weight based upon (A) of Hexamethyldisilazane stabilizer.

(G) 0.24 parts by weight based upon (A) of $Bu_2Sn(Acac)_2$ condensation cure catalyst (H) 0.7 parts by weight based upon (A) of Glycidoxypropyltrimethoxysilane co-adhesion promoter (GLYMO).

The GLYMO and CETMS together form an adhesion promoter system suitable for polycarbonates.

WP EXTRUDER MIXING PROCEDURE

All sections of the extruder were heated to 75° C. To barrel 1, of the extruder, there was continuously metered in 12 parts (B); 30 parts (A) polymer; 1 part hexamethyldiilazane (F); and 0.5 parts cyanoethyltrimethoxysilane (C). To barrel 8, of the extruder, there was continuously metered in 30 parts (A) polymer, 18 parts (D1) fluid; 7 parts (D2) fluid; 1part methyltrimethoxysilane (E); .5 parts glycidoxyprop-yltrimethoxysilane (H); and 0.24 parts $Bu_2Sn(Acac)_2$ (G). A de-airing vacuum was applied to barrel 11. RTV sealant was continuously produced at a rate of 4 lb./hr.

For comparison, RTV compositions referred to as compositions (2), (3), (4), (5), (6), (7), (8), (9), and (10) were prepared with the same formulation and continuous mixing procedure as in composition (1) with the omission of "GLYMO" as an adhesion aid and replacement with varying organo-silane adhesion aids as follows:

| Composition | Adhesion Promoter Type |
| --- | --- |
| 2 | CETMS Only |
| 3 | methacryloxypropyltrimethoxysilane |
| 4 | 1,3,5-tris(trimethoxysilyl-propylisocyanurate) |
| 5 | bis(3-trimethoxysilyl-propylmaleate) |
| 6 | 1,2 bis(trimethoxysilylpropyl)ethane |
| 7 | g-aminopropyltrimethoxysilane |
| 8 | g-aminopropyltriethoxysialne |
| 9 | aminoethylaminopropyltrimethoxysilane |
| 10 | vinyltrimethoxysilane |

Peel adhesion, of the above RTV compositions, was measured on Lexan TM 101 polycarbonate after (1) a 7-day cure at RT and 50% RH and (2) a 7-day cure at RT and 50% RH followed by a 7-day RT water immersion. Results are given in Table 1. Acceptable peel adhesion values are defined as >20ppi pull values with >90% cohesive failure. The data shows that adhesion to Lexan is obtained only with "GLYMO" as a co-adhesion promoter

TABLE 1

PEEL ADHESION RESULTS (ppi/% CF)

| Composition | 7 Day Cure (ppi/% Coh. Fail) | 7 Day Cure/ 7 Day Water Immersion (ppi/% Coh. Fail)* |
| --- | --- | --- |
| 1 | 35/100 | 21/100 |
| 2 | 0/0 | 0/0 |
| 3 | 0/0 | 0/0 |
| 4 | 0/0 | 0/0 |
| 5 | 0/0 | 0/0 |
| 6 | 0/0 | 0/0 |
| 7 | 0/0 | 0/0 |
| 8 | 0/0 | 0/0 |
| 9 | 0/0 | 0/0 |
| 10 | 0/0 | 0/0 |

*(ppi/% Coh. Fail.) Peel adhesion ppi is the force required to separate the plates. % Cohesive/failure is the amount remaining on the plate with the highest failure (i.e., removal of adhesive).

Composition (1) was tested for adhesion to polycarbonate in the lap shear mode with two 4"×1" wafers overlapped 0.5" at the narrow ends with 1 mm bondline. 120 ppi with 100% cohesive failure Lap shear adhesion was measured after a 7 day cure followed by a 3 day immersion in 60° C. water on Lexan TM 101 polycarbonate. Composition (1) was also tested for other uncured and cured sealant properties as summarized in Table 2:

TABLE 2

| PROPERTY | COMPOSITION (1) RESULT |
| --- | --- |
| Appearance | Translucent |
| Specific Gravity | 1.035 |
| Boeing Flow, inch | 0.1 |
| Tack Free Time, min | 30 |
| Sheet Physicals (7 Day Cure) | |
| Durometer, Shore A | 18 |
| Tensile, ppi | 220 |
| Elongation, % | 450 |
| Accel. Shelf Age Sheet Physicals (24 hr. @ 100 deg. C. 7 day cure) | |
| Durometer, Shore A | 18 |
| Tensile, ppi | 230 |
| Elongation, % | 480 |
| Peel Adhesion (7 day cure) | |
| Glass (ppi/% Coh. Fail.)* | 26/100 |
| 2024 Alclad Aluminum | 33/100 |
| Anodized Aluminum | 35/100 |
| Cold Rolled Steel | 35/70 |
| Stainless Steel | 38/100 |
| PVC Plastic | 38/100 |
| ABS Plastic | 34/100 |

*(ppi/% Coh. Fail.) Peel adhesion ppi is the force required to separate the plates. % Cohesive/failure is the amount remaining on the plate with the highest failure (i.e., removal of adhesive).

EXAMPLE II

Figure 1:
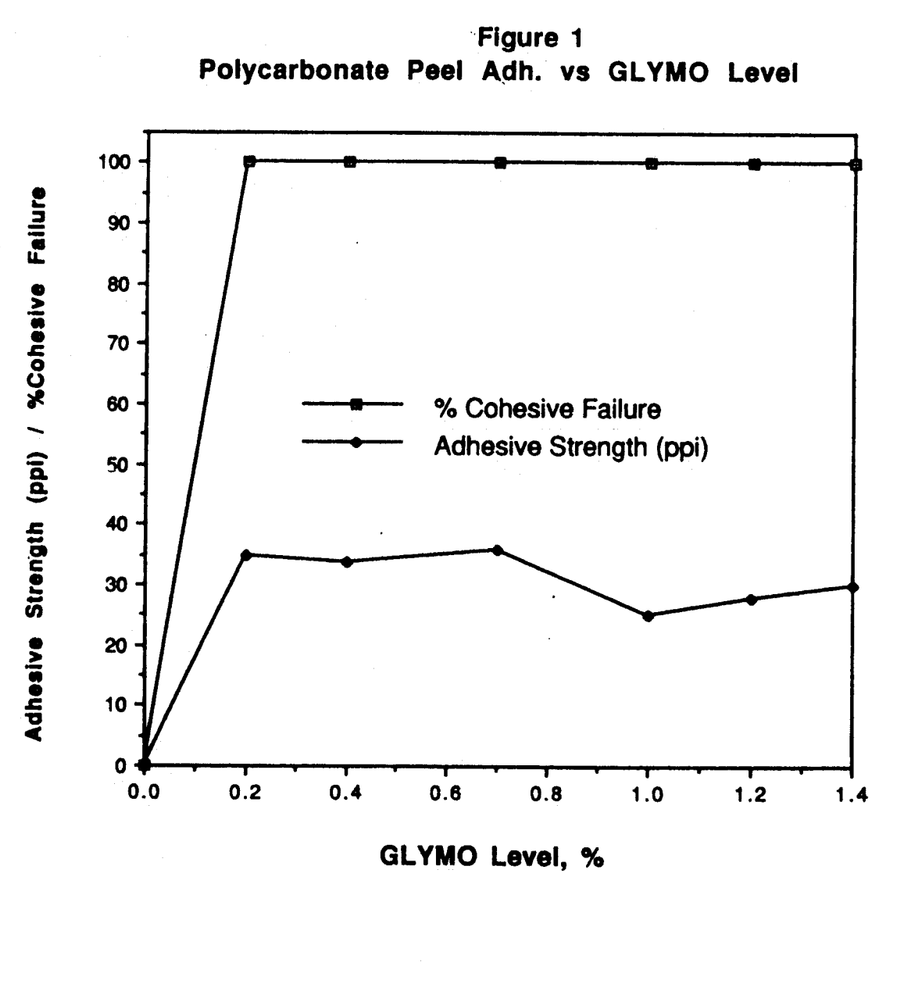
FIG. 1 is a plot of polycacarbonate peel adhesion and percent cohesive failure versus GLYMO content.

RTV compositions were prepared with the same formulation as in Example I composition (1) except that the GLYMO adhesion aid was varied as follows:
0 pbw
0.2 pbw
0.4 pbw
0.6 pbw
0.8 pbw
1.0 pbw
1.2 pbw
1.4 pbw Peel adhesion was measured on Lexan TM 101 after a 7 day cure. Results are shown in FIG. 1. The data shows that adhesion to Lexan TM is relatively insensitive to GLYMO level assuming GLYMO is present at some trace level (i.e. 0.2 pbw).

EXAMPLE III

Figure 2:
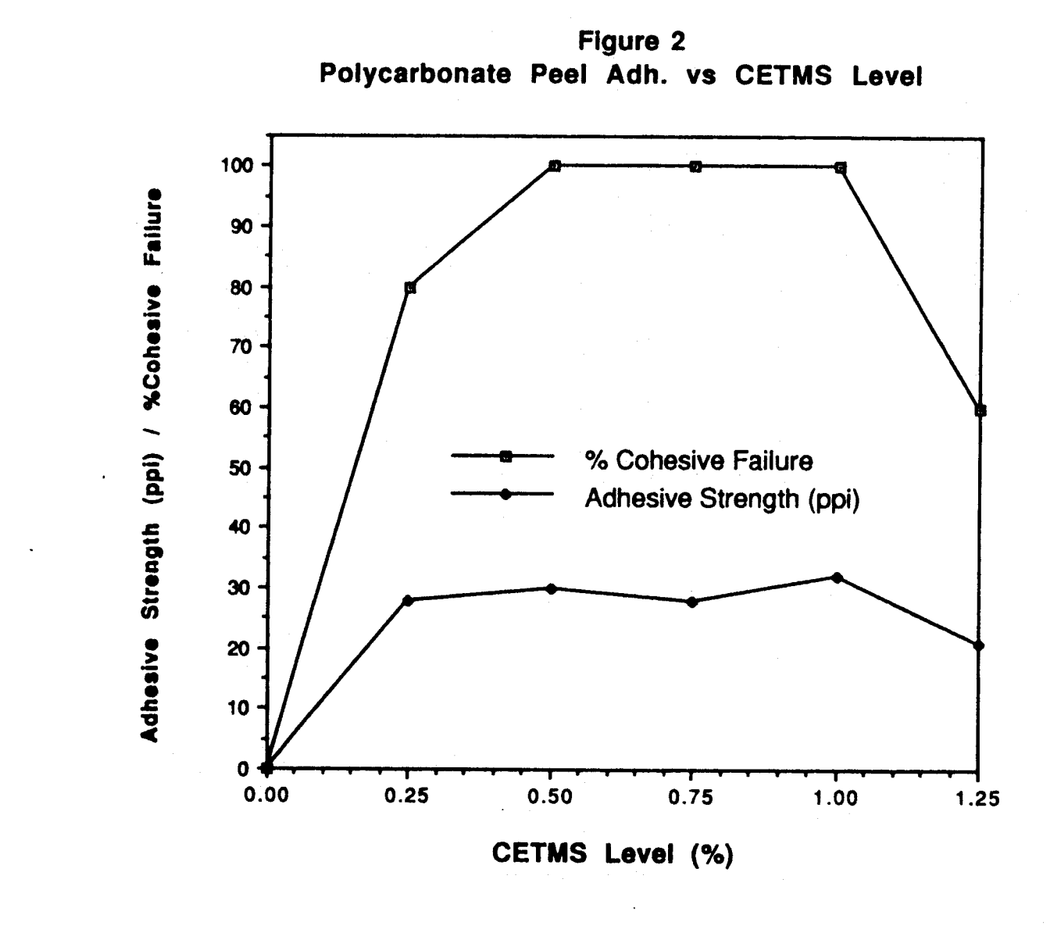
FIG. 2 is a plot of polycarbonate peel adhesion and percent cohesive failure versus CETMS content.

RTV compositions were prepared with the same formulation as in Example I composition (1) except that the "CETMS" was varied as follows:
0 pbw
0.2 pbw
0.4 pbw
0.6 pbw
0.8 pbw
1.0 pbw
1.2 pbw Peel adhesion was measured on Lexan TM 101 after a 7 day cure. Results are shown in FIG. 2. The data shows that optimum Lexan TM adhesion is obtained in the range of 0.25-1.0 pbw CETMS.

EXAMPLE IV

RTV compositions were prepared with the same formulations as in Example I composition (1) except that the $Bu_2Sn(Acac)_2$ condensation cure catalyst was replaced by the following commercial tin cure catalysts:
dibutyltindiacetate
dibutyltindilaurate
dibutyltindimethoxide
dimethyltindi(neodeconoate)
solubilized dibutyltinoxide
tin octoate Peel adhesion was measured on Lexan TM 101 after a 7 day cure. No measurable adhesion values were obtained using any of the above condensation cure catalysts. Of the condensation cure catalysts studied, only $Bu_2Sn(Acac)_2$ catalyzed RTV compositions had primerless adhesion to polycarbonate.

EXAMPLE V

RTV compositions were prepared with the same formulations as in Example I composition (1) except that the $Bu_2Sn(Acac)_2$ condensation cure catalyst level was varied as follows:

| | |
|---|---|
| 0.10 pbw | 0.26 |
| 0.12 pbw | 0.28 |
| 0.14 pbw | 0.30 |
| 0.16 pbw | 0.32 |
| 0.18 pbw | 0.34 |
| 0.20 pbw | 0.36 |
| 0.22 pbw | 0.38 |
| 0.24 pbw | 0.40 |

Figure 3:
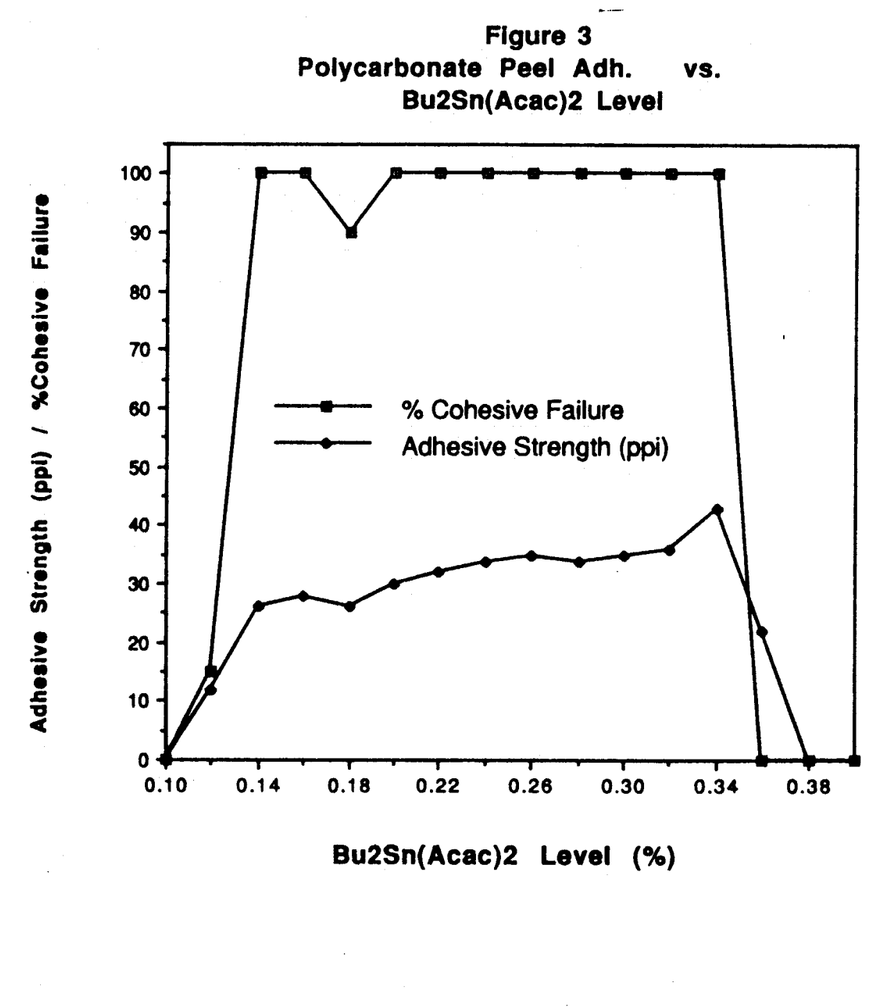
FIG. 3 is a plot of polycarbonate peel adhesion and percent cohesive failure versus catalyst content.

Peel adhesion was measured on Lexan TM 101 after a 7 day cure. Results are shown in FIG. 3. The data show that optimum Lexan TM adhesion is obtained in the range of 0.15-0.34 pbw $Bu_2Sn(Acac)_2$.

EXAMPLE VI

RTV compositions were prepared with the same formulation as in Example I composition (1) except that the (B) fumed silica filler was varied as follows:

| (B) Filler Level | Specific Gravity |
|---|---|
| 8 pbw | 1.020 |
| 9 pbw | 1.025 |
| 10 pbw | 1.030 |
| 11 pbw | 1.035 |
| 12 pbw | 1.040 |
| 13 pbw | 1.045 |
| 14 pbw | 1.050 |
| 15 pbw | 1.055 |
| 16 pbw | 1.060 |
| 17 pbw | 1.065 |

Figure 4:
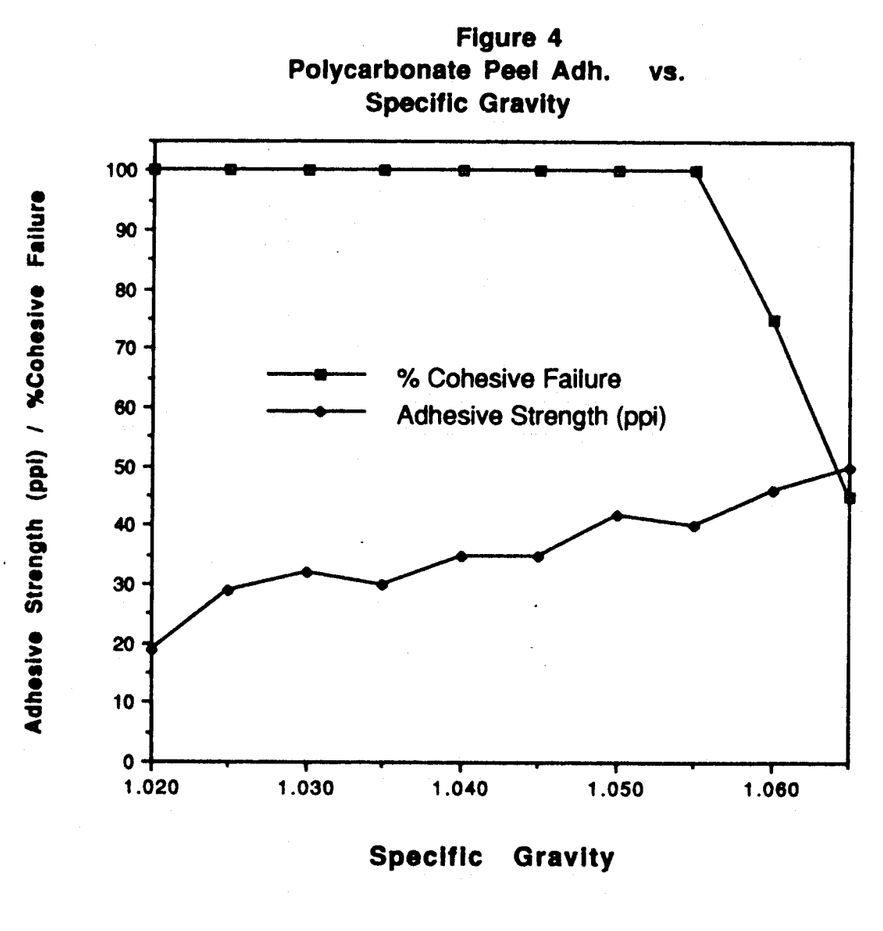
FIG. 4. is a plot of polycarbonate peel adhesion and percent cohesive failure versus specific gravity.

Peel adhesion was measured on Lexan TM 101 after a 7 day cure. Results are shown in FIG. 4. The data shows that optimum Lexan TM adhesion is obtained at a 1.025-1.050 specific gravity range.

EXAMPLE VII

Figure 5:
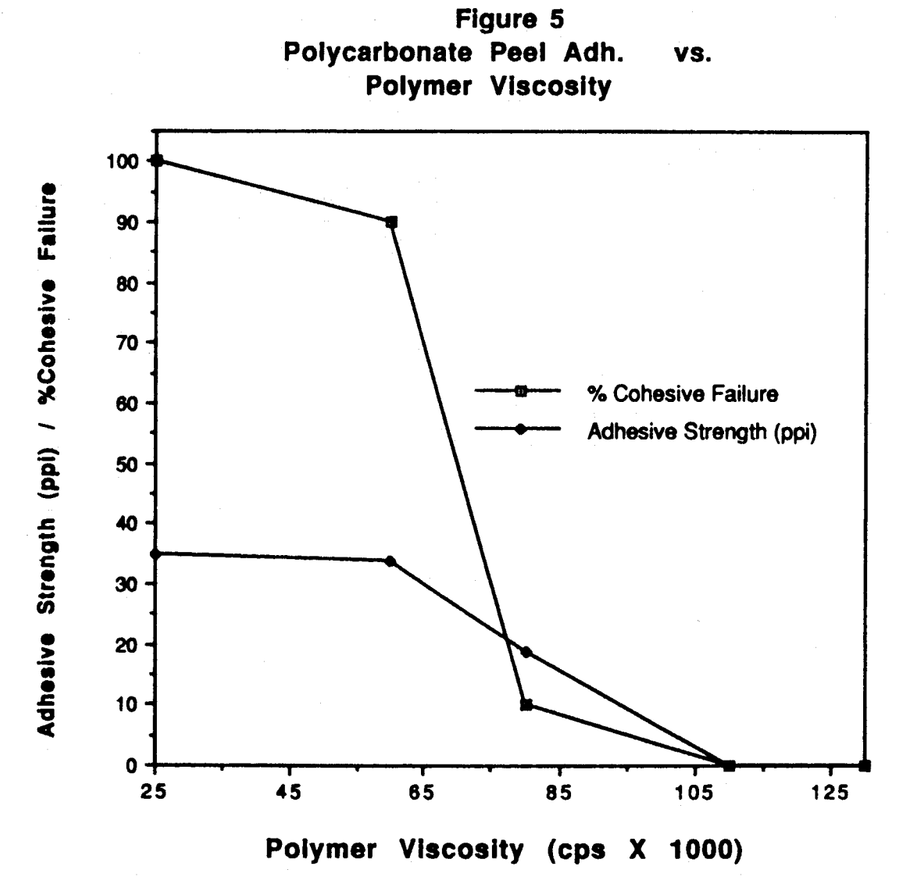
FIG. 5 is a plot of polycarbonate peel adhesion and percent cohesive failure versus polymer viscosity.

RTV compositions were prepared with the same formulation as in Example I composition (1) except that the (A) methyldimethoxy terminated polydimethylsiloxane polymer viscosity was varied as follows:
15,000 cps
60,000 cps
80,000 cps
110,000 cps
130,000 cps Peel adhesion was measured on Lexan TM 101 after a 7 day cure. Results are shown in FIG. 5. The data shows that Lexan TM adhesion varies inversely with polymer viscosity with 60,000 cps being the preferred maximum allowable polymer viscosity for an RTV Lexan TM adhesive.

EXAMPLE VIII

Figure 6:
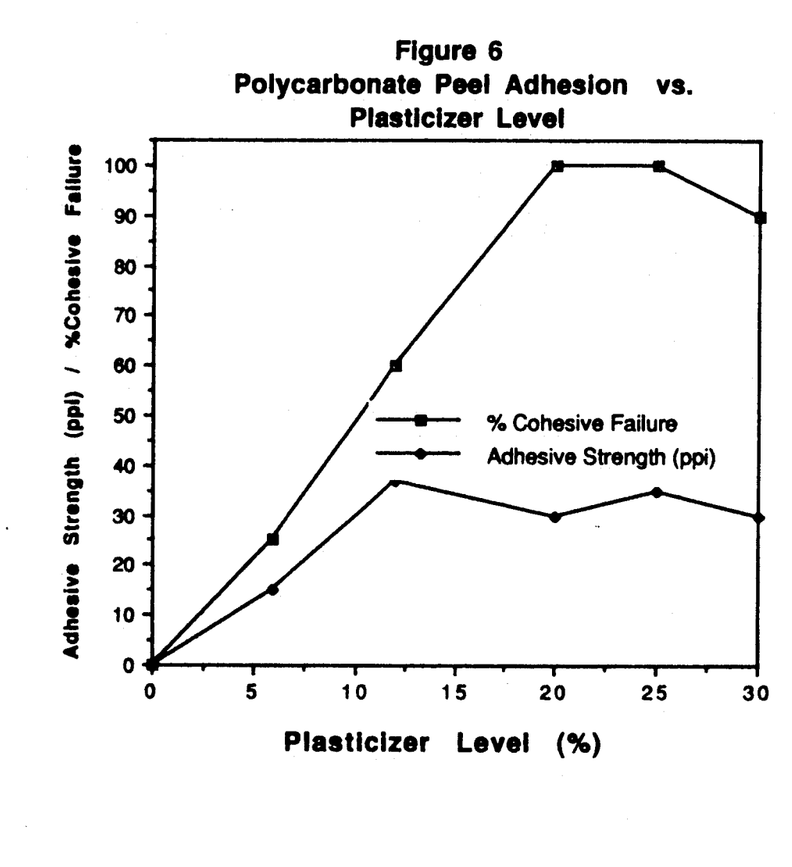
FIG. 6 is a plot of polycarbonate peel adhesion and percent cohesive failure versus plasticizer content.

RTV compositions were prepared with the same formulation as in Example I composition (1) except that the (D1)/(D2) plasticizer content was varied as follows:
0 pbw
6 pbw
12 pbw
20 pbw
25 pbw
30 pbw Peel adhesion was measured on Lexan TM 101 after a 7 day cure. Results are shown in FIG. 6. The data shows that optimum Lexan TM adhesion is obtained at 12-25% (D1)/(D2) plasticizer content.

EXAMPLE IX

Figure 7:
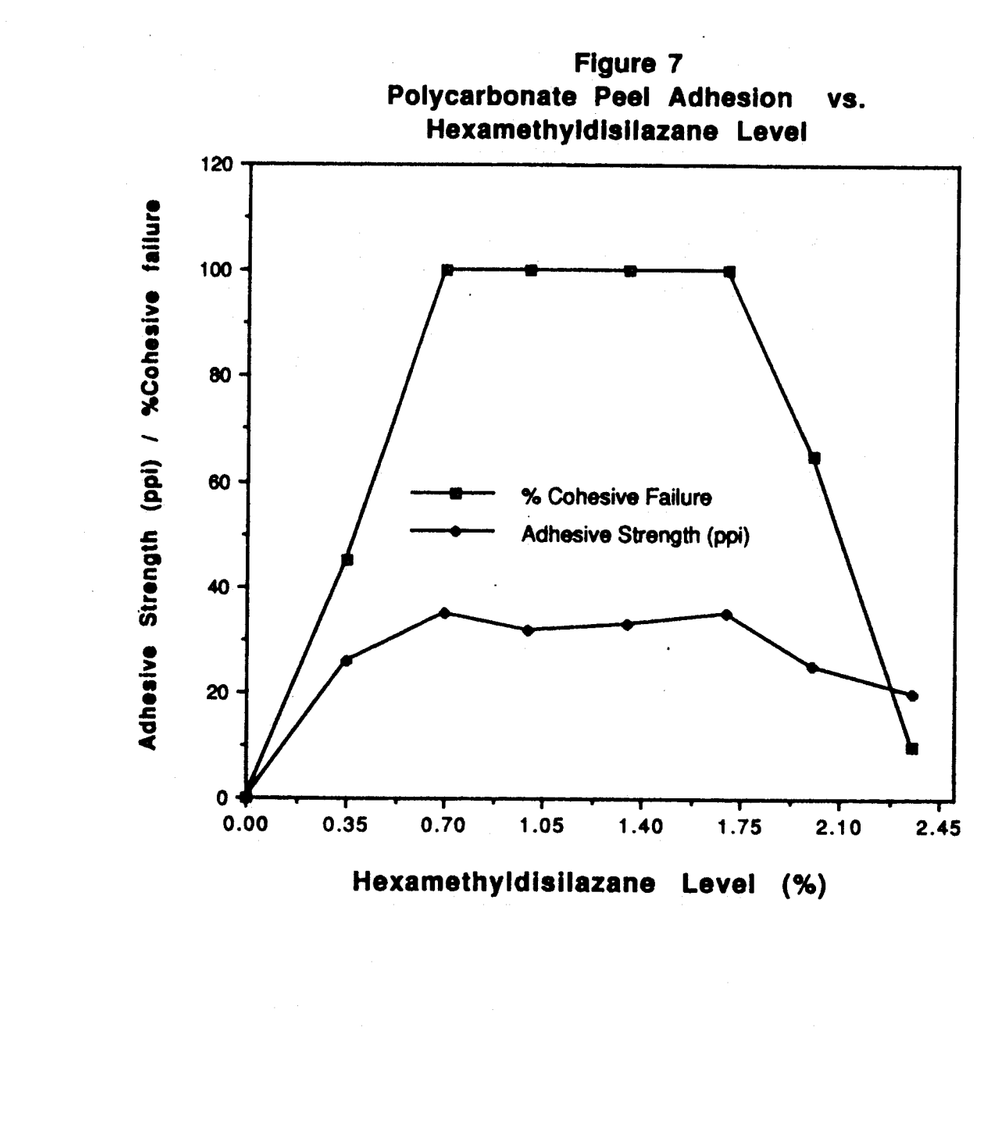
FIG. 7 is a plot of polycarbonate peel adhesion and percent cohesive failure versus HMDZ content.

RTV compositions were prepared with the same formulation as in Example I composition (1) except that the (F) hexamethyldisilazane stabilizer content was varied as follows:
0 pbw
0.35 pbw
0.70 pbw
1.0 pbw
1.35 pbw
1.70 pbw
2.0 pbw
2.35 pbw Peel adhesion was measured on Lexan TM 101 after a 7 day cure. Results are shown in FIG. 7. The data shows that optimum Lexan TM adhesion is obtained at 0.7-1.7 pbw (F) hexamethyldisilazane content.

While there have been described what at present are considered to be the preferred embodiments of the present invention, it will be readily apparent to those skilled in the art that various changes may be made therein without departing from the invention and it is intended in the claims to cover such changes and modifications as fall within the true spirit and scope of the invention.

What is claimed:

1. A shelf stable, translucent, one component room temperature vulcanizable composition having improved primerless adhesion to polycarbonate, comprising:

(A) 100 parts of a polyalkoxy terminated poly dimethylsiloxane having the formula:

where each R and $R^2$ is independently a substituted or unsubstituted monovalent hydrocarbon radical shaving from 1 to 15 carbon atoms, $R^1$ is a $C_{(1-8)}$ aliphatic organic radical selected from alkyl radicals, alkyl ether radicals, alkylketone radicals, alkylcyano radicals, or a $(C_{7-13})$ aralkyl radical; "n" is a whole number ranging from about 5 to about 2500, and "a" is a whole number which is either 0 or 1having a viscosity ranging from 50 to about 65,000 cps at 25° C.;

(B) from about 5 to about 20 parts by weight based upon (A) of a silica filler;

(C) from about 0.3 to about 1 part by weight based upon (A) of a cyano-functional polyalkoxy silane adhesion promoter having the formula:

where each $R^3$ and $R^4$ is independently a $C_{(1-18)}$ monovalent hydrocarbon or substituted hydrocarbon radical, $R^5$ is a $C_{(2-12)}$ divalent hydrocarbon radical, and "t" is a number ranging from 0 to about 3;

(D) from about 15 to 30 parts by weight based upon (A) of a blend comprising:

(D1) 10 to 100 parts by weight of a triorganosilyl endstopped diorganopolysiloxand having a viscosity of from 10 to 5000 cps at 25° C., where the organo groups are $C_{(1-8)}$ monovalent hydrocarbon radicals, and (D2) 10 to 40 parts by weight of a low viscosity polysiloxane fluid containing monoalkylsiloxy units, siloxy units or mixtures of monoalkyl siloxy units and siloxy units;

(E) up to about 5 parts by weight based upon (A) of a polyalkoxysilane crosslinking agent having the formula:

where $R^1$, $R^2$ and "a" are as defined above;

(F) from about 0.3 to 1.7 parts by weight based upon (A) of a stabilizing polysilazane;

(G) About 0.14 to about 0.34 parts by weight based upon (A) of a diorganotin-bis-diketonate condensation cure catalyst having the general formula:

where $R^6$ is selected from monovalent hydrocarbon radicals or substituted hydrocarbon radicals, and $R^7$, $R^8$, and $R^9$ are the same or different monovalent radicals selected from the group consisting of hydrogen, $R^6$, $OR^6$, $-Si(R^6)_3$, aryl, acyl, and nitrile (H) From about 0.1 to about 2 parts by weight based upon (A) of an epoxy silane adhesion promoter having the formula:

where $R^{10}$ and $R^{11}$ are $C_{(1-8)}$ monovalent hydrocarbon radicals, $R^{12}$ and $R^{13}$ are substituted or unsubstituted $C_{(2-12)}$ divalent hydrocarbon radicals, $R^{14}$ is selected from the group consisting of hydrogen and monovalent hydrocarbon radicals having 1 to about 8 carbon atoms and "b" varies from 0 to 3.

2. The one component composition of claim 1 wherein (B) is a fumed silica having a surface area ranging from about 100 to about 300 $(m^2gm)m^2/gm$.

3. The one component composition of claim 2, wherein (B) has a surface area ranging from about 150 to about 250 $m^2/gm$.

4. The one component composition of claim 1, wherein (B) is present in an amount ranging from about 9 to about 12 parts by weight based upon (A).

5. The one component composition of claim 1, wherein (B) is present in an amount ranging from about 10 to about 11 parts by weight based upon (A).

6. The one component composition of claim 1, wherein (C) is present in an amount ranging from about 0.4 to about 0.8 parts by weight based upon (A).

7. The one component composition of claim 1, wherein (C) is present in an amount ranging from about 0.6 to about 0.7 based upon (A).

8. The one component composition of claim 1, wherein $R^3$ and $R^4$ of the compound (C) of formula (2) are alkyl radicals, or alkenyl radicals, or cycloalkyl radicals, or mononuclear aryl radicals, or fluoroalkyl radicals.

9. The one component composition of claim 8, wherein $R^3$ and $R^4$ are methyl or ethyl.

10. The one component composition of claim 8, wherein $R^3$ and $R^4$ are methyl.

11. The one component composition of claim 8, wherein $R^5$ is a $C_{(2-12)}$ alkylene or arylene substituted divalent hydrocarbon radical.

12. The one component composition of claim 11, wherein $R^5$ has from about 2 to about 8 carbon atoms.

13. The one component composition of claim 8, wherein (C) comprises beta cyano ethyl trimethoxysilane.

14. The one component composition of claim 8, wherein (C) is selected from the group consisting of:

3-(cyanoethoxy)-3-methylbutenyltrimethoxysilane;
beta-cyanoethylmethyldimethoxysilane;
beta-cyanoethyltriethoxysilane;
beta-cyanopropyltrimethoxysilane;
2-cyanoethylmethyldiethoxysilane;
3-cyanopropyltriethoxysilane;
cyanopropylmethyldimethoxysilane; and
1-cyanoethyltris(methoxyethoxy)silane.

15. The one component composition of claim 7, wherein (D) is present in an amount ranging from about 18 to about 27 parts by weight based upon (A).

16. The one component composition of claim 7, wherein (D) is present in an amount ranging from about 20 to about 25 parts by weight based upon (A).

17. The one component composition of claim 7, wherein (D1) is present in an amount ranging from about 30 to about 70 parts by weight.

18. The one component composition of claim 1, wherein (D1) contains up to 500 ppm silanol groups.

19. The one component composition of claim 1, wherein (D1) is free of silanol groups.

20. The one component composition of claim 1, wherein (D1) has methyl substituted groups.

21. The one component composition of claim 1, wherein (D1) has a viscosity ranging from about 10 to about 1000 cps at 25° C.

22. The one component composition of claim 1, wherein (D2) has more than about 10 mole percent of tri- or tetrafunctional or both groups.

23. The one component composition of claim 1, wherein (D2) is present in an amount ranging from about 10 to about 40 parts by weight.

24. The one component RTV composition of claim 1, wherein (D2) is present in an amount ranging from about 20 to about 30 parts by weight.

25. The one component composition of claim 1, wherein (D2) contains from about 25 to about 60 mole percent of monoalkoxysiloxy units, or siloxy units or mixtures thereof.

26. The one component composition of claim 1, wherein (D2) contains from about 1 to about 6 mole percent of trialkylsiloxy units.

27. The one component composition of claim 1, wherein (D2) contains from about 34 to about 74 mole percent of dialkylsiloxy units.

28. The one component composition of claim 1, wherein (D2) contains from about 0.1 to about 2 percent by weight of silicon bonded hydroxyl units.

29. The one component composition of claim 1, wherein (D2) has a viscosity ranging from about 5 to about 100 cps at 25° C.

30. The one component composition of claim 1, wherein (E) is present in an amount ranging from about 0.5 to about 4 parts by weight based upon (A).

31. The one component composition of claim 7, wherein (E) is present in an amount ranging from about 1 to about 2 parts by weight based upon (A).

32. The one component composition of claim 1, wherein (F) is present in an amount ranging from about 0.5 to about 1.5 parts by weight based upon (A).

33. The one component composition of claim 1, wherein (F) is present in an amount ranging from about 0.75 to about 1.25 parts by weight based upon (A).

34. The one component composition of claim 1, wherein (F) comprises hexamethyldisilazane.

35. The one component composition of claim 1, wherein $R^6$ radicals are $C_{(6-13)}$ aryl or halogenated aryl radicals.

36. The one component composition of claim 35, wherein $R^6$ is selected from the group consisting of phenyl, tolyl, chlorophenyl, and naphthyl.

37. The one component composition of claim wherein $R^6$ is selected from $C_{(1-18)}$ aliphatic or cycloaliphatic radicals, or halogenated derivatives.

38. The one component composition of claim 37, wherein $R^6$ is selected from the group consisting of cyclohexyl, cyclobutyl; alkyl and alkenyl radicals.

39. The one component composition of claim 1, wherein (G) is selected from a group consisting of:
Di(n-butyl)tinbis(acetylacetonate);
Di(n-butyl)tinbis(benzoylacetonate);
Di(ethyl)tinbis(lauroylacetonate);
Di(methyl)tinbis(pivaloylacetonate);
Di(n-octyl)tinbis(acetylacetonate);
Di(n-propyl)tinbis(1,1,1-trifluoro-acetylacetonate);
Di(n-butyl)tin(acetylacetonate) (ethylacetoacetate)

40. The one component composition of claim 1, wherein (G) is free of diorganotin dicarboxylate.

41. The one component RTV composition of claim 1, wherein (H) is present in an amount ranging from 0.5 to 1.5.

42. The one component RTV composition of claim 1, wherein (H) is present in an amount ranging from about 0.75 to about 1.0.

43. The one component composition of claim 1, wherein $R^{12}$ and $R^{13}$ are divalent hydrocarbon radicals.

44. The one component composition of claim 43, wherein $R^{12}$ and $R^{13}$ are selected from the group consisting of alkylene, arylene, and alkylenearylene.

45. The one component composition of claim 1, wherein $R^{12}$ and $R^{13}$ are substituted with groups selected from the group consisting of halogen, ether, and hydrocarbon groups.

46. The one component composition of claim 43 wherein $R^{14}$ is hydrogen.

47. The one component composition of claim 43, wherein (H) comprises material selected from the group consisting of:
g-glycidoxypropylmethyldimethoxysilane,
g-glycidoxypropyltriethoxysilane,
g-glycidoxypropylmethyldiethoxysilane,
g-glycidoxyethyltrimethoxysilane,
epoxycyclohexylethyltrimethoxysilane, and
eopxycyclohexylethyltrimethoxysilane.

48. The one component composition of claim 43, wherein (H) comprises g-glycidoxyethyltrimethoxysilane.

49. A shelf stable, translucent, one component room temperature vulcanizable organo-polysiloxane composition having improved primerless adhesion to polycarbonate comprising:
a polyalkoxysilane end capped dimethyl silicone polymer having a viscosity of up to about 65,000 cps at 25° C.;
a reinforcing silica filler;
a trimethyl stopped organosiloxane plasticizing oil;
a polyalkoxy silane crosslinker;
a silazane;
a condensation cure catalyst; and
an adhesion promoter system including adhesion-promoting amounts of a glycidoxypropyltrimethoxy silane and a cyanoethyltrimethoxy silane.

50. A one component room temperature vulcanizable composition having improved adhesion to polycarbonate comprising:

A) a polyalkoxysilane endcapped dimethyl silicone having a viscosity up to about 65,000 cps at 25° C.;

B) from about 3 to about 16 parts by weight based upon (A) of a silica filler;

D) from about 15 to about 30 parts by weight based upon (A) of a trimethylstopped organosiloxane oil or oils having a viscosity up to 5,000 cps at 25° C.;

E) up to about 5 parts by weight based upon (A) of a polyalkoxysilane crosslinking agent;

F) from about 0.3 to about 1.7 parts by weight based upon (A) of a silazane;

G) from about 0.14 to about 0.34 parts by weight based upon (A) of a diorganotin-bis-diketonate condensation cure catalyst, and an comprising comprising:

C) from about 0.3 to about 1 part by weight based upon (A) of a cyano-functional polyalkoxy silane; and H) from about 0.1 to about 2 parts of an epoxy silane.

* * * * *